United States Patent
Childs et al.

(10) Patent No.: US 10,292,208 B2
(45) Date of Patent: May 14, 2019

(54) SOLAR PANEL

(76) Inventors: Montgomery W. Childs, Shanty Bay (CA); William DeBurger, Whitefish (CA)

(*) Notice: Subject to any disclaimer, the term of this patent is extended or adjusted under 35 U.S.C. 154(b) by 606 days.

(21) Appl. No.: 13/180,812

(22) Filed: Jul. 12, 2011

(65) Prior Publication Data
US 2013/0014807 A1    Jan. 17, 2013

(51) Int. Cl.
*H02S 40/12* (2014.01)
*H05B 3/26* (2006.01)

(52) U.S. Cl.
CPC .......... *H05B 3/265* (2013.01); *H02S 40/12* (2014.12); *H05B 2203/034* (2013.01)

(58) Field of Classification Search
CPC ... H05B 3/265; H05B 2203/034; H02S 40/00; H02S 40/12
USPC ................................ 136/244, 251
See application file for complete search history.

(56) References Cited

U.S. PATENT DOCUMENTS

| | | | |
|---|---|---|---|
| 2,429,420 A | 10/1947 | McMaster | |
| 2,470,509 A * | 5/1949 | Marini | 156/102 |
| 2,675,456 A | 5/1951 | Cleminson et al. | |
| 3,376,165 A | 4/1968 | Abbot | |
| 3,459,391 A | 8/1969 | Haynos | |
| 4,099,517 A | 7/1978 | McRae | |
| 4,233,957 A | 11/1980 | Kenny | |
| 4,313,023 A * | 1/1982 | Stephens | 136/246 |
| 4,864,100 A | 9/1989 | Cicak | |
| 5,338,369 A | 8/1994 | Rawlings | |
| 5,368,654 A | 11/1994 | Bergevin et al. | |
| 6,093,885 A | 7/2000 | Takehara et al. | |
| 7,129,444 B2 * | 10/2006 | Weiss | 219/203 |
| 7,638,708 B2 * | 12/2009 | Fork et al. | 136/246 |
| 2005/0005785 A1 * | 1/2005 | Poss et al. | 100/240 |
| 2005/0199282 A1 | 9/2005 | Oleinick et al. | |
| 2007/0222743 A1 * | 9/2007 | Hirakata | 345/102 |
| 2008/0000195 A1 * | 1/2008 | Clarahan | 52/786.13 |
| 2008/0028697 A1 | 2/2008 | Li et al. | |
| 2010/0236608 A1 * | 9/2010 | Ball et al. | 136/251 |
| 2011/0056924 A1 | 3/2011 | Townsend | |
| 2012/0037215 A1 | 2/2012 | Ball et al. | |
| 2012/0180844 A1 * | 7/2012 | Ward, III | 136/246 |

OTHER PUBLICATIONS

Office Action of Canadian Patent Application No. 2,758,501 dated Jun. 14, 2017.

* cited by examiner

*Primary Examiner* — Tamir Ayad
(74) *Attorney, Agent, or Firm* — Eugene F. Derényi; Fogler Rubinoff LLP

(57) ABSTRACT

There is disclosed a photovoltaic solar panel capable of clearing accumulated ice. The panel includes a plurality of photovoltaic cells arranged in a plane with an overlaying glass sheet. The glass sheet has a first side towards the photovoltaic cells and a second side having a flat planar surface. The panel further includes an electrical heating web on the first side of the glass sheet between the sheet and the photovoltaic cells. The electrical heating web is configured to heat the first glass sheet sufficiently to melt the ice where it contacts the flat planar surface to cause the snow and ice to slide off the photovoltaic solar panel when the photovoltaic solar panel is at an angle from the horizontal. The electrical heating web is thermally separated from the photovoltaic cells by a transparent layer of low thermal conductivity.

11 Claims, 5 Drawing Sheets

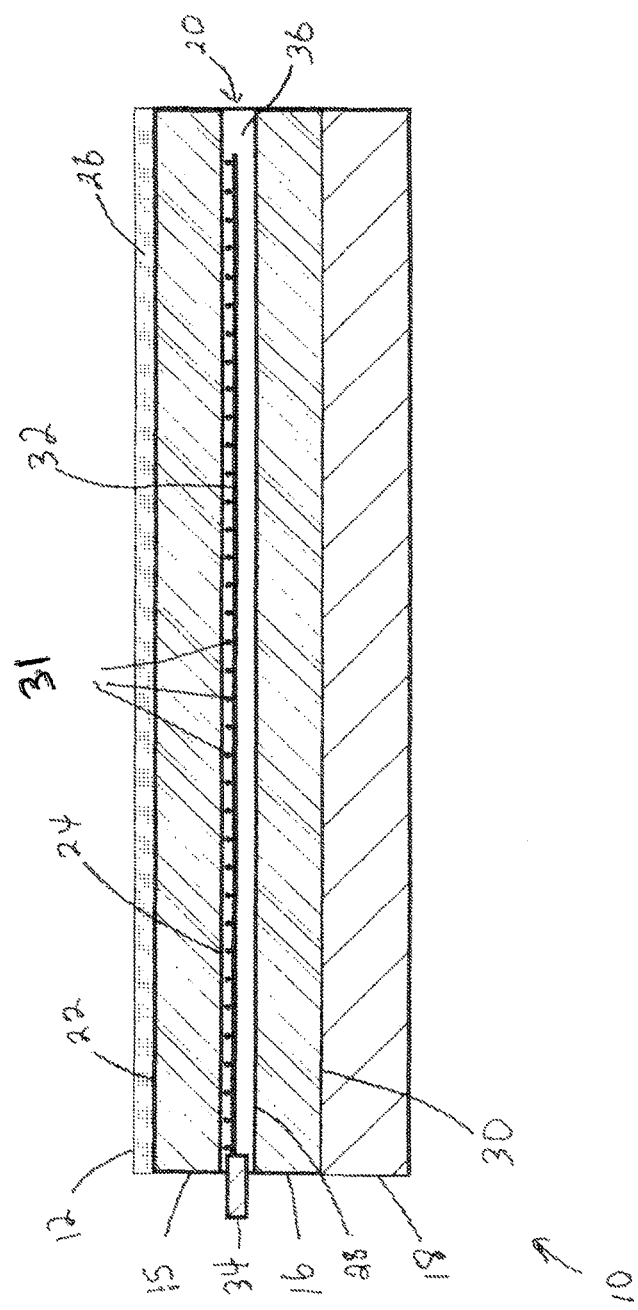

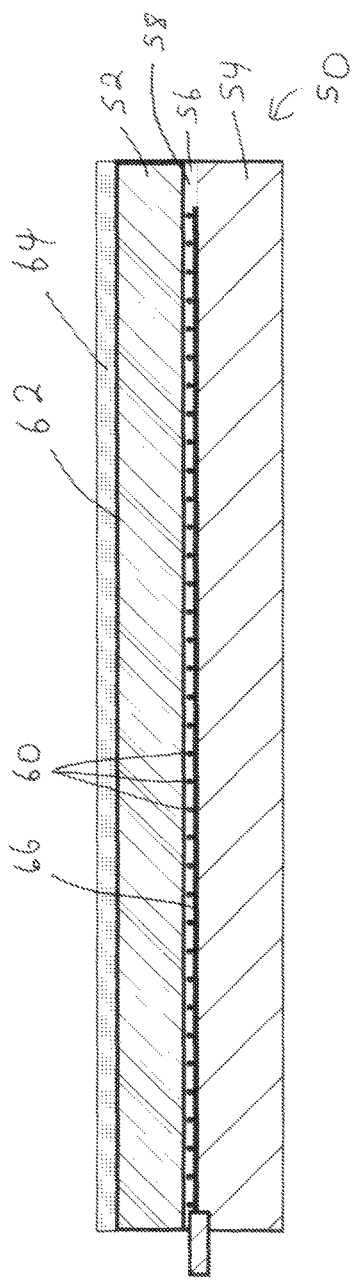

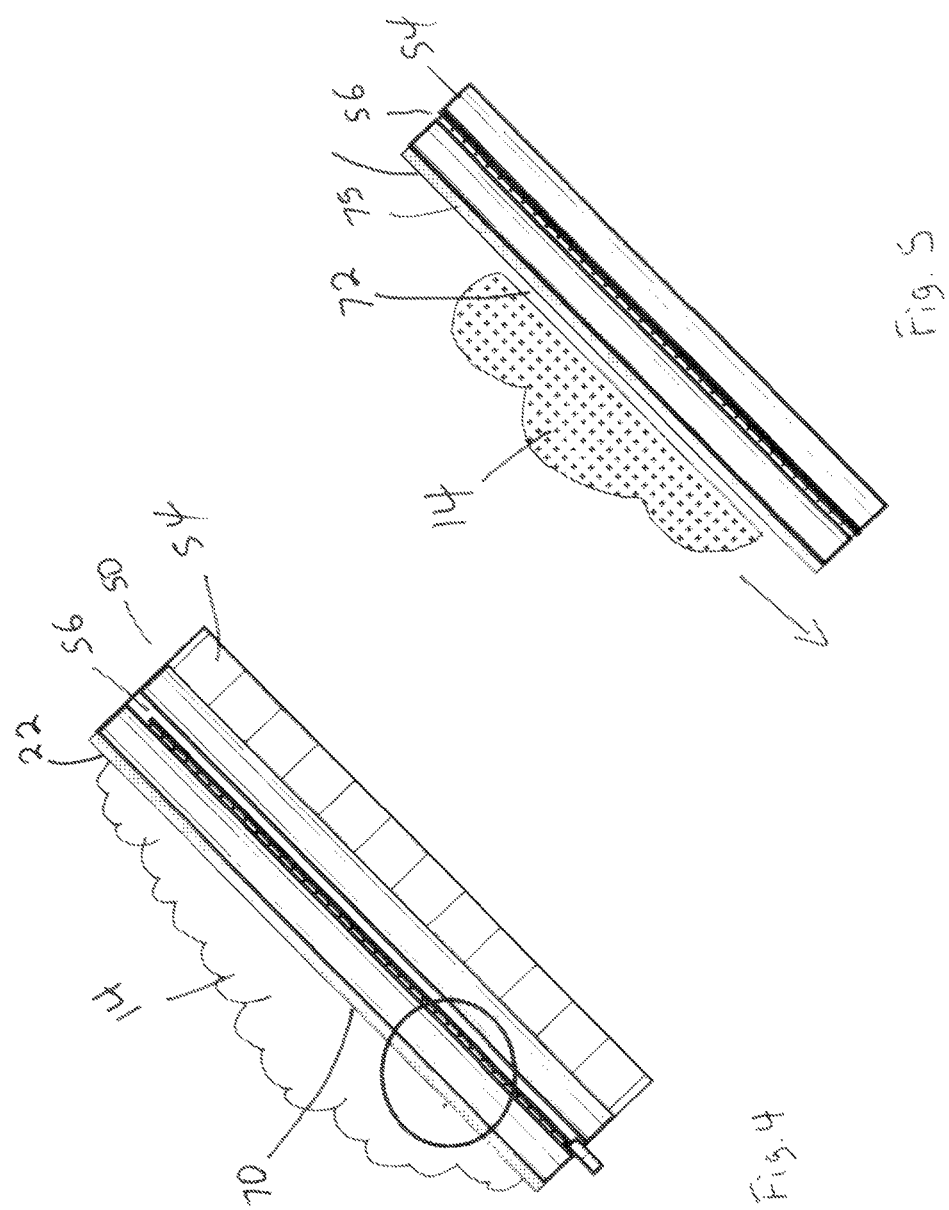

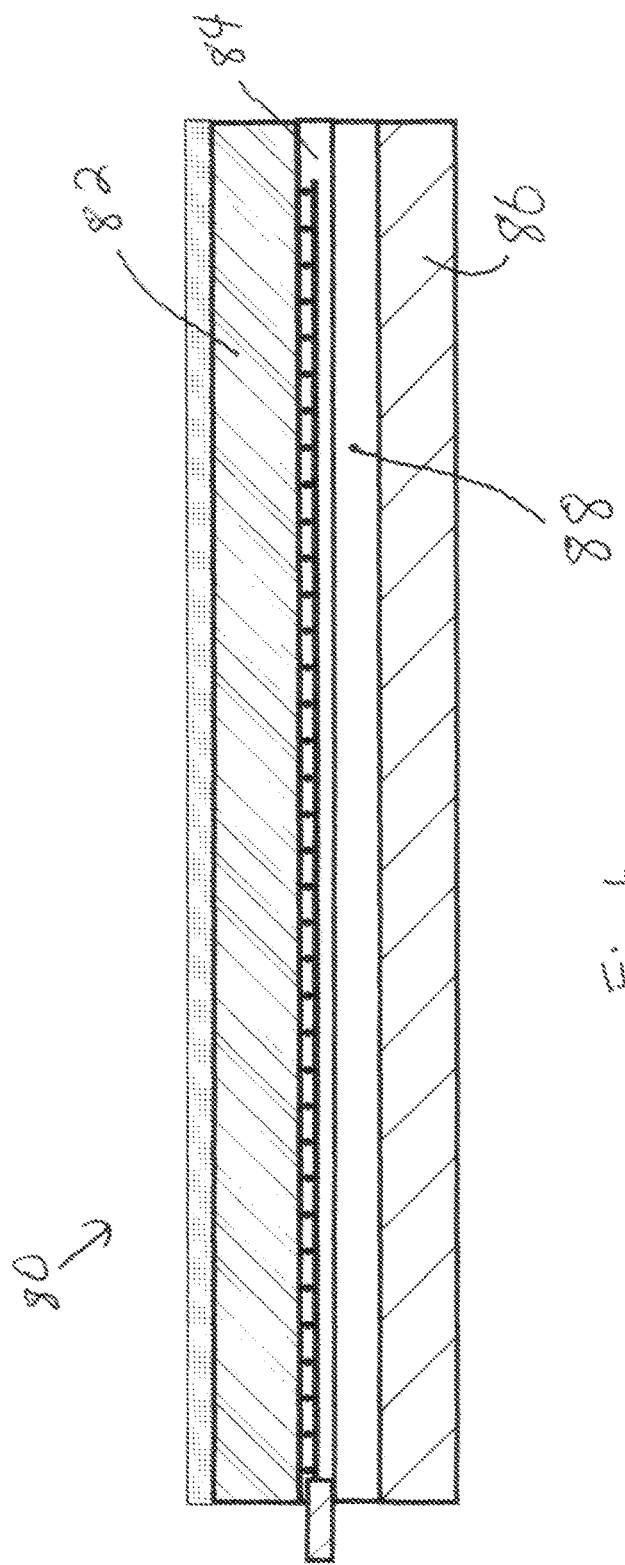

SOLAR PANEL

FIELD OF THE INVENTION

The invention relates generally to solar panels.

BACKGROUND OF THE INVENTION

Photovoltaic solar panels have been developed to convert sunlight directly into electrical energy. Photovoltaic solar panels are effective whenever they are exposed to direct sunlight, even in cold climates. Unfortunately, photovoltaic solar panels do not generate much electricity when they are covered with snow or ice. Therefore, in cold climates, the overall efficiency of solar panels is reduced due to the fact that snow and ice accumulates on top of the solar panels. To become effective, the layer of snow and ice overburdening the solar panel must be cleared, either by scrapping (or sweeping) the snow away or by melting. Melting the snow and ice overburden can be achieved by heating the solar panels sufficiently to melt away all of the snow and ice; however, given the amount of energy required to do this, the overall gain in efficiency is very low. U.S. Pat. No. 4,063,963 to Bond Jr. discloses the use of electric heating elements placed directly on top of photovoltaic cells to help melt away any accumulated snow and ice. However, such a design has a very low overall efficiency because a large amount of electrical energy is required to heat the photovoltaic cells sufficiently to melt the snow and ice. What is therefore required is an energy efficient way of clearing snow and ice from solar panels.

SUMMARY OF THE INVENTION

In accordance with one aspect of the present invention, there is provided a photovoltaic solar panel capable of clearing ice accumulated on a surface thereof. The photovoltaic solar panel includes a plurality of photovoltaic cells arranged adjacent one another in a plane and a transparent glass sheet overlaying the photovoltaic cells. The glass sheet has a first side positioned towards the photovoltaic cells and an opposite second side having a flat planar surface extending along the entirety of the second side. The panel further includes an electrical heating web extending along the first side of the glass sheet between the glass sheet and the photovoltaic cells, the electrical heating web being thermally coupled to the glass sheet. The electrical heating web is configured to generate enough heat to heat the flat planar surface of the first glass sheet to sufficiently melt the ice where it contacts the flat planar surface so as to cause the snow and ice to slide off the photovoltaic solar panel when the photovoltaic solar panel is held at an angle from the horizontal.

In accordance with another aspect of the present invention, there is provided a photovoltaic solar panel as described above wherein the electrical heating web is thermally separated from the photovoltaic cells by a transparent layer of low thermal conductivity.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 2 is a cross sectional view of a solar panel made in accordance with one aspect of the present invention.

FIG. 3 is a cross sectional view of a solar panel made in accordance with another aspect of the present invention.

FIG. 4 is a cross sectional schematic view of a solar panel made in accordance with the present invention showing the panel partially covered by snow.

FIG. 5 is a close up view of portion A of FIG. 4.

FIG. 6 is a cross sectional view of a solar panel made in accordance with another aspect of the present invention.

In the drawings like characters of reference indicate corresponding parts in the different figures.

DETAILED DESCRIPTION OF THE INVENTION

Figure 1:
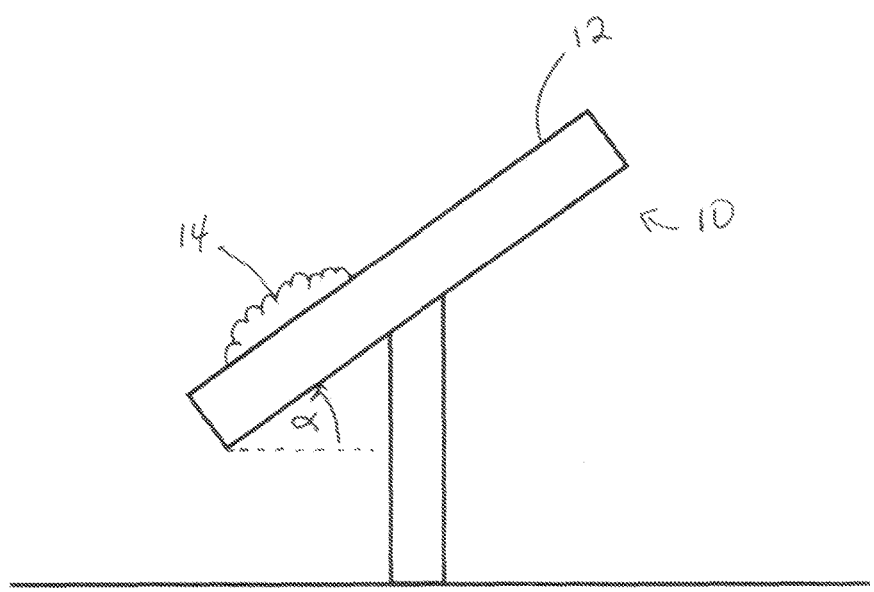
FIG. 1 is a side view of a solar panel made in accordance with the present invention mounted at an angle to the horizontal and partially covered by snow and ice.

Referring to FIG. 1, the present invention is essentially a flat photovoltaic solar panel 10 having a flat top surface 12 which is configured to clear a layer of snow and ice overburden 14 by a combination of melting and gravity. Solar panel 10 is preferably set at an angle α from the horizontal to ensure that snow and ice overburden 14 slides off the solar panel when a layer of ice and/or snow contacting the solar panel is partially melted. Surface 12 is made of very flat glass which is free of protrusions, cavities, ridges or any other surface feature which would provide additional surface area for ice to cling to and which would obstruct the movement of snow and ice off the surface when the snow and ice are melted. Overburden 14 remains on top of panel 10 because a thin layer of ice forms a layer of contact (or adhesion) with surface 12. This contact layer is effectively frozen to surface 12 and causes the rest of the overburden to cling to the panel. As shall be discussed further, solar panel 12 is provided with a heating element which is configured to generate just enough heat to raise the temperature of surface 12 sufficiently to melt this contact layer of snow/ice to form a micro layer of water on surface 12. Melting this contact layer to form this micro-layer of water permits the rest of the snow and ice piled on top of the panel to simply slide off the panel.

Referring now to FIG. 2, a photovoltaic solar panel made in accordance with the present invention is shown generally as item 10 and consists of a flat array of photovoltaic cells 18 formed as a flat plane. Solar cells 18 are aligned in a side by side flat parallel plane. Overlaying photovoltaic cells 18 is first glass sheet 15. Glass sheet 15 is dimensioned to overlay the entire photovoltaic array 18 and to extend as much as a centimeter or so beyond the edges of the photovoltaic array. Extending the glass sheet beyond the edges of the photovoltaic array may be necessary to physically contain the solar panel in a suitable frame. Glass sheet 15 is a very flat highly transparent glass sheet of low Fe glass. Glass sheet 15 has a first side 24 which is directed towards photovoltaic cells 18 and an opposite second side 22 which forms a very flat surface. An anti-reflective coating 26 can be formed on side/surface 22 to prevent the reflection of sunlight and thereby increase the photovoltaic performance of the solar panel. The dimensions of anti-reflective coating 26 are exaggerated in FIG. 2; in practice, an anti-reflective coating would be a fraction of a mm in thickness. A second glass sheet 16 is positioned between glass sheet 15 and solar cells 18. Glass sheet 16 has opposite surfaces 28 and 30, with surface 30 positioned adjacent solar cells 18. Glass sheet 16 is also made from highly transparent low Fe glass.

Electrical heating web 20 is positioned between glass sheets 16 and 15. Electrical heating web 20 consists of a flat electric heating element which is configured to turn an electric current into heat. Heating web 20 extends along first surface 24 of glass sheet 1 overlaying the entire photovoltaic array 18. Electrical heating web 20 is thermally coupled to glass sheet 15 such that heat generated by heating web 20 is passed to glass sheet 15 and thereby to surface 22. Heating web 20 must be sufficiently rated to generate enough heat to form a micro layer of water by melting a contact layer of ice which may form on top of sheet 15. Of course, this melting must occur when the temperature of the environment is freezing. It has been discovered that for northern climates, heating web 20 should preferably be rated at one or two watts per decimeter; however, the exact watt rating will be determined by the desired performance of the heating web, the likely operating temperatures and the amount of expected snow and ice overburden. In particularly cold climates with large amounts of snow, it is likely that increased heating would be required. Successful tests in Sudbury, Canada have been run using solar panels having heating webs rated at 6 watts per decimeter. This ensures that the heating element is sufficiently powerful. Preferably, the heating element is selected such that power is introduced into the panel sufficient to satisfy a gain in panel temperature over ambient above freezing to create a micro layer of water Electrical heating web may consist of any flat heating element which has high transparency such as an electrically conductive silver film. It has been discovered that electrical conducting tungsten microfilaments having a diameter of between about 50 to 10 microns is particularly useful. Preferably, heating web 20 consists of a plurality of spaced apart parallel tungsten micro-filaments 31 having opposite ends which are coupled to an electric buss bar 32 and electrical connector 34. Buss bar 32 and electrical connector 34 are positioned to make the panel easy to construct with the electrical terminals close together. Micro-filaments 31 are positioned as close to surface 24 as possible. Preferably, micro-filaments 31 are embedded in a transparent polymer layer 36 which acts to secure the micro-filaments and keep them in the appropriate orientation. Transparent polymer layer 36 is preferably between about 0.4 mm to 4 mm in thickness. Depending on the transparent polymer used, layer 36 can act to decrease the flow of heat from glass sheet 15 to glass sheet 18. Several suitable polymers are commercially available which are highly transparent.

Glass sheet 18 helps to protect electric heating web 20 and also acts to add additional strength. Furthermore, glass sheet 16 acts as a thermal barrier between heating web 20 and photovoltaic cells 18. As shall be better explained below, the heat energy generated by heating web 20 is preferably to be used to melt a layer of ice clinging to the surface 22 of glass sheet 15. While heating the entire panel to a high temperature would be effective in melting accumulated snow, the electrical energy required to do so would greatly decrease the overall efficiency of the solar panel. Silicon (the principle ingredient in photovoltaic cells) is metallic and is an efficient thermal conductor with a conductivity of about 150 W/m-K. By contrast, aluminum has a conductivity of about 250 W/m-K and carbon steel has a conductivity of about 54 W/m-K. Since silicon is a good conductor of heat, placing the heating element directly on the photovoltaic cells would require large amounts of electrical energy to be consumed since the silicon would radiate away most of the heat. In such an arrangement, most of the electrical energy consumed by the heating element would be used to heat the silicon solar cell and then radiated away. Very little of the electrical energy would be used to melt ice. Placing a transparent material having a low thermal conductivity between heating web 20 and photovoltaic cells 18 would greatly decrease the heat lost to the photovoltaic cells. Glass has a thermal conductivity of about 1 W/m-K, therefore, placing a glass sheet between the heating web and the silicon photovoltaic cells, results in a vastly less heat being radiated away by the photovoltaic cells. As a result, a far greater percentage of the electrical energy consumed by the heating element will be used to melt the snow and ice covering the solar panel. Glass sheet 16 could be made thicker than glass sheet 15 to maximize the transfer of heat towards glass sheet 15.

Referring now to FIG. 3 it is possible to construct a solar panel in accordance with the present invention, shown generally as item 50, with only a single layer of glass. In panel 50, a single glass sheet 52 is used. Glass sheet 52 has flat upper surface 62 having an anti-reflective coating 64 formed thereon. Electrical heating web 56 is positioned between glass sheet 52 and photovoltaic cells 54. Again, heating web 56 preferably consists of a plurality of tungsten micro-filaments 60 coupled to an electrical buss bar 66. Again, micro-filaments 60 are positioned as close to glass sheet 52 as possible in order to thermally couple glass sheet 52 to electrical heating micro-filaments 60. Again, the micro-filaments are contained within a transparent polymer layer 58. In order to decrease the amount of heat transferred from the heating micro-filaments to the silicon photovoltaic cells, the thickness of polymer layer 58 should be increased, depending on the thermal conductivity of the polymer used. Several transparent polymers have thermal conductivities as low as 0.1 W/m-K to 0.2 W/m-K. The thicker the layer, the less thermal energy is wasted in heating photovoltaic cells. Of course, the transparency of the layer may be compromised if the layer is made too thick. It is important to ensure that there is some relatively non-heat conductive material separating heating web 56 and photovoltaic cells 54. Since the embodiment shown in FIG. 3 does not include a layer of glass separating heating web 56 and photovoltaic cells 54, polymer layer 58 must be sufficiently thick to decrease the flow of heat from the heating web to the photovoltaic cells.

Referring now to FIGS. 4 and 5, snow overburden 14 forms a contact layer 70 which is frozen onto surface 75 of panel 50. This contact layer prevents overburden 14 from falling off panel 50. By engaging heating web 56, heat is transferred to surface 75 which causes contact layer 70 to melt to form a water micro layer 72 separating surface 75 from overburden 14. This very thin layer of water acts to greatly decrease the coefficient of friction between the overburden and surface 75, which causes overburden 14 to slide off the solar panel due to the action of gravity. Since panel 50 is at an angle from the vertical, the force of gravity acts on overburden 14 to cause it to slide off the panel when the coefficient of friction between the overburden and surface 75 is low enough. Generally, only a few minutes of heating is required to form water micro-layer 72. The vast majority of overburden 14 is not heated or melted, but simply slides off. Since heating web 56 is thermally insulated (isolated) from photovoltaic cells 54, very little heat is wasted and more of it is used to form water micro-layer 72. In this way, a very small amount of energy can be used to clear solar panel 50.

Referring now to FIG. 6, it is possible to decrease the flow of heat from the heating element to the underlying photovoltaic cells by setting off the heating element from the photovoltaic cells to form an "air gap" between the heating element and the photovoltaic cells. A solar panel made with this in mind is depicted in FIG. 6 and is shown generally as item 80. Panel 80 has a glass upper sheet 82 with heating element 84 thermally coupled thereto as in the previous embodiment. However, unlike the previous embodiment, gap 88 is positioned between heating element 84 and photovoltaic cells 86. Preferably, gap 88 could be filled with a dry low conductive gas such as argon. Gap 88 greatly reduces the flow of heat from heating element 84 and photovoltaic cells 86.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims Therefore, what is claimed is:

1. A photovoltaic solar panel capable of clearing snow and ice accumulated on a surface thereof, the photovoltaic solar panel comprising:
   a. a plurality of photovoltaic cells arranged adjacent one another in a plane;
   b. a first transparent glass sheet comprising low Fe glass overlaying the photovoltaic cells, the glass sheet having a first side positioned towards the photovoltaic cells and an opposite second side having a flat surface extending along the entirety of the second side;
   c. a transparent layer, having a thermal conductivity, separating the glass sheet and the photovoltaic cells, wherein the transparent layer is a layer of transparent polymer, and
   d. an array of electrical heating microfilaments comprising silver positioned within the transparent layer and not directly on the photovoltaic cells or the glass sheet such that uniform thermal heat distribution is promoted across the glass sheet, wherein the photovoltaic cells, the glass sheet, the transparent layer and the array of electrical heating microfilaments are assembled without a frame, and the electrical heating microfilaments in the array being arranged in, each of the electrical heating microfilaments in the array having a diameter of between 10 to 50 microns,
   wherein the glass sheet and the photovoltaic cells directly contact the polymer layer; and
   wherein the transparent layer is sufficiently thick to decrease the amount of heat transferred from the microfilaments, when in use, to the photovoltaic cells, without compromising the transparency of the transparent layer.

2. The photovoltaic solar panel of claim 1 wherein the transparent layer having a thickness of between 0.4 mm to 4 mm.

3. The photovoltaic solar panel of claim 2 wherein the array of electrical heating microfilaments is configured to generate heat at a rate of about 6 watts per square decimeter.

4. A photovoltaic solar panel capable of clearing ice accumulated on a surface thereof, the photovoltaic solar panel comprising:
   a. a plurality of photovoltaic cells arranged adjacent one another in a plane;
   b. a first transparent glass sheet comprising low Fe glass overlaying the photovoltaic cells, the glass sheet having a first side positioned towards the photovoltaic cells and an opposite second side having a flat surface extending along the entirety of the second side;
   c. a transparent layer, having a thermal conductivity, separating the glass sheet and the photovoltaic cells, wherein the transparent layer is a layer of transparent polymer;
   d. an electrical heating web comprising silver positioned within the transparent layer and not in contact with either the photovoltaic cells or the glass sheet such that uniform thermal heat distribution is promoted across the glass sheet, and
   e. wherein the photovoltaic cells, the glass sheet, the transparent layer and the electrical heating web are assembled without a frame, and the electrical heating web being configured to generate enough heat to heat the flat surface of the glass sheet to sufficiently melt the ice where it contacts the flat planar surface so as to cause the snow and ice to slide off the photovoltaic solar panel when the photovoltaic solar panel is held at an angle from the horizontal,
   wherein the glass sheet and the photovoltaic cells directly contact the polymer layer, and
   wherein the transparent layer is sufficiently thick to decrease the amount of heat transferred from the microfilaments, when in use, to the photovoltaic cells, without compromising the transparency of the transparent layer.

5. The photovoltaic solar panel of claim 4 wherein the electrical heating web comprises a plurality of electrical heating microfilaments arranged in a parallel array.

6. The photovoltaic solar panel of claim 5 wherein the electrical heating microfilaments each have a diameter of between about 10 to about 50 microns.

7. The photovoltaic solar panel of claim 1 wherein the polymer has a thermal conductivity in the range of 0.1 W/m-K to 0.2 W/m-K.

8. The photovoltaic solar panel of claim 1 further comprising an anti-reflective coating on the flat surface of the opposite second side of the glass sheet.

9. The photovoltaic solar panel of claim 4 wherein the polymer has a thermal conductivity in the range of 0.1 W/m-K to 0.2 W/m-K.

10. The photovoltaic solar panel of claim 4 further comprising an anti-reflective coating on the flat surface of the opposite second side of the glass sheet.

11. A photovoltaic solar panel capable of clearing snow and ice accumulated on a surface thereof, the photovoltaic solar panel consisting of:
   a. a plurality of photovoltaic cells arranged adjacent one another in a plane;
   b. a first transparent glass sheet comprising low Fe glass overlaying the photovoltaic cells, the glass sheet having a first side positioned towards the photovoltaic cells and an opposite second side having a flat surface extending along the entirety of the second side;
   c. a transparent layer, having a thermal conductivity, separating the glass sheet and the photovoltaic cells, wherein the transparent layer is a layer of transparent polymer, and
   d. an array of electrical heating microfilaments comprising silver positioned within the transparent layer and not directly on the photovoltaic cells or in direct contact with the glass sheet such that uniform thermal heat distribution is promoted across the glass sheet, wherein the photovoltaic cells, the glass sheet, the transparent layer and the array of electrical heating microfilaments are assembled without a frame, and the electrical heating microfilaments in the array being arranged in, each of the electrical heating microfilaments in the array having a diameter of between 10 to 50 microns, wherein the glass sheet and the photovoltaic cells directly contact the polymer layer; and wherein the transparent layer is sufficiently thick to decrease the amount of heat transferred from the microfilaments, when in use, to the photovoltaic cells, without compromising the transparency of the transparent layer.

* * * * *